(12) United States Patent
Sadeghi et al.

(10) Patent No.: US 9,913,309 B2
(45) Date of Patent: Mar. 6, 2018

(54) TECHNIQUES FOR DISCOVERY OF WI-FI SERIAL BUS AND WI-FI DOCKING SERVICES

(71) Applicant: INTEL CORPORATION, Santa Clara, CA (US)

(72) Inventors: Bahareh Sadeghi, Portland, OR (US); Emily H. Qi, Camas, WA (US); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/070,534

(22) Filed: Mar. 15, 2016

(65) Prior Publication Data
US 2017/0048689 A1    Feb. 16, 2017

Related U.S. Application Data

(63) Continuation of application No. 14/125,858, filed as application No. PCT/US2013/052317 on Jul. 26, 2013, now Pat. No. 9,445,347.

(60) Provisional application No. 61/810,980, filed on Apr. 11, 2013.

(51) Int. Cl.
| | |
|---|---|
| *H04W 76/02* | (2009.01) |
| *H04W 40/24* | (2009.01) |
| *H04W 48/16* | (2009.01) |
| *H04L 29/08* | (2006.01) |
| *H04L 29/12* | (2006.01) |
| *H04W 8/00* | (2009.01) |
| *H04W 84/12* | (2009.01) |
| *H04W 4/00* | (2018.01) |

(52) U.S. Cl.
CPC ....... *H04W 76/023* (2013.01); *H04L 61/2038* (2013.01); *H04L 67/104* (2013.01); *H04L 67/16* (2013.01); *H04W 8/005* (2013.01); *H04W 40/246* (2013.01); *H04W 48/16* (2013.01); *H04W 4/008* (2013.01); *H04W 84/12* (2013.01)

(58) Field of Classification Search
CPC . H04W 76/023; H04W 76/043; H04W 76/04; H04W 76/02; H04W 80/00; H04W 80/02; H04W 80/04; H04W 40/246
See application file for complete search history.

(56) References Cited

U.S. PATENT DOCUMENTS

| | | |
|---|---|---|
| 2010/0069006 A1 | 3/2010 | Baek |
| 2012/0265913 A1 | 10/2012 | Suumaeki et al. |
| 2014/0196112 A1* | 7/2014 | Huang .................. G06F 1/1632 726/3 |
| 2015/0016417 A1 | 1/2015 | Dees et al. |
| 2015/0206190 A1* | 7/2015 | Lee ....................... H04W 48/16 705/14.64 |
| 2015/0373765 A1* | 12/2015 | Lee ....................... H04W 8/005 370/329 |

OTHER PUBLICATIONS

Extended European Search Report received for European patent Application No. 13881905.7, dated Oct. 26, 2016, 8 pages.
(Continued)

*Primary Examiner* — Ashley Shivers

(57) ABSTRACT

Techniques are disclosed for discovery of Wi-Fi serial bus and Wi-Fi docking services. Such networks include (but are not limited to) IEEE 802.11 networks.

22 Claims, 3 Drawing Sheets

(56) References Cited

OTHER PUBLICATIONS

"Wi-Fi Peer-to-Peer (P2P) Technical Specification v1.1", Wi-Fi Alliance Specification, Jan. 1, 2010, 159 pages.
Extended European Search Report received for European Patent Application No. 17200789.0, dated Nov. 28, 2017, 7 pages.

* cited by examiner

US 9,913,309 B2

TECHNIQUES FOR DISCOVERY OF WI-FI SERIAL BUS AND WI-FI DOCKING SERVICES

RELATED CASE

This application is a continuation of, claims the benefit of and priority to previously filed U.S. patent application Ser. No. 14/125,858 filed Dec. 12, 2013 (subsequently issued as U.S. Pat. No. 9,445,347), which is a national phase entry of PCT/US2013/052317 filed Jul. 26, 2013, which claims the benefit of U.S. Provisional Patent Application No. 61/810,980, filed Apr. 11, 2013; all of the above are incorporated herein by reference in their entirety.

TECHNICAL FIELD

Examples described herein are generally related to discovery of Wi-Fi serial bus and Wi-Fi docking services.

BACKGROUND

With the increased popularity of Wi-Fi networks for wireless connectivity, there are new services frequently being developed that use the underlying Wi-Fi links for peripheral connectivity, for example Wi-Fi Serial Bus (WSB) and Wi-Fi docking (WDC).

Thus, there are general needs for improved techniques for discovery of Wi-Fi serial bus and Wi-Fi docking services.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION

Figure 1:
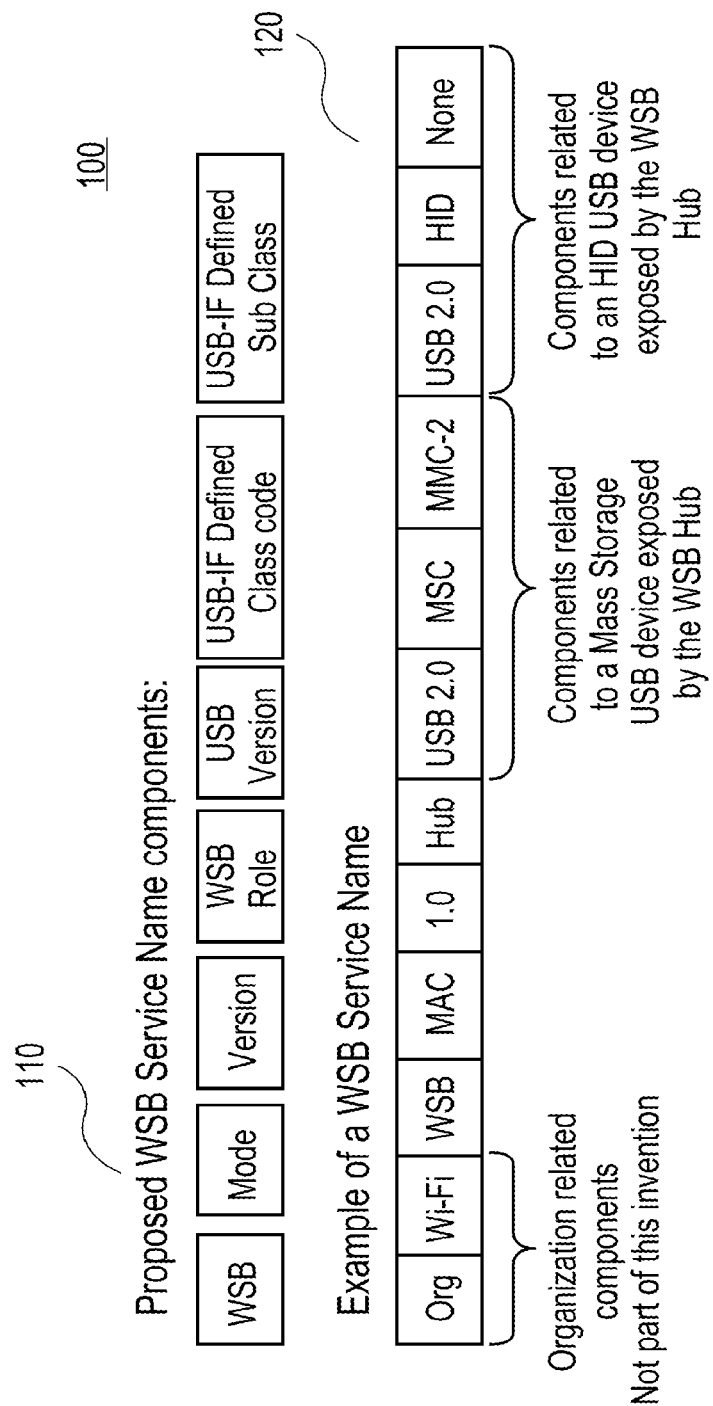
FIG. 1 is an illustration of Wi-Fi Serial Bus (WSB) Service Name components and an example WSB Service Name.

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with devices and/or networks operating in accordance with existing WiGig Serial Extension Specification Version 1.2, July 2012, Final specification. Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11 task group ac (TGac) ("IEEE802.11-09/0308r12—TGac Channel Model Addendum Document"); IEEE 802.11 task group ad (TGad) (IEEE P802.11ad Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band)) and/or future versions and/or derivatives thereof, devices and/or networks operating in accordance with existing WirelessHD™ specifications and/or future versions and/or derivatives thereof, units and/or devices which are part of the above networks, and the like.

Problem

With increased popularity of Wi-Fi networks for wireless connectivity, there are new services being developed that use the underlying Wi-Fi links for peripheral connectivity, for example Wi-Fi Serial Bus (WSB) and Wi-Fi docking (WDC). WSB enables support of USB traffic over Wi-Fi links and allows a WSB host to connect to Wi-Fi enabled USB devices/functions (WSB peripherals) wirelessly and to legacy USB devices/functions via a Wi-Fi enabled USB hub (WSB Hub).

Wi-Fi docking enables a Wi-Fi enabled device (Dockee) to connect wirelessly to a Wi-Fi dock (WDC) which, in turn, provides peripheral connectivity to the Dockee. The peripherals may be connected to the WDC either wirelessly or through wire/cable.

Wi-Fi Direct (Wi-Fi P2P technology) is a key enabling technology for both WSB and Wi-Fi docking. It enables discovery of devices that are WSB or Wi-Fi docking capable; however, to meet the expected user experience, discovering generic capabilities is not sufficient. Instead, the protocol must be able to provide users with additional and specific information regarding the services supported by a device before association and establishing connection with the device. This is specifically important in enterprise, coffee shops or other dense environments where there may be many WDCs and WSB peripherals available. In such a situation, the user needs to efficiently learn about the services provided by each WDC and WSB peripheral before associating and establishing a connection. Using existing solutions like P2P technology, in which the user needs to first connect to be able to learn about the services provided by and specific capabilities of the device, adds extensive delay and does not result in a satisfactory user experience.

Solution

To address this problem, Wi-Fi Direct defines an optional service discovery mechanism. However, it is noted that the Wi-Fi direct service discovery mechanism is not efficient in searching for devices and introduces high overhead. To address the deficiencies of Wi-Fi Direct service discovery mechanisms, embodiments herein provide utilizing a Wi-Fi Direct Services (WFDS) framework which defines an extensible and efficient service discovery for discovery of services that use Wi-Fi Direct technology.

Embodiments described label WSB and Wi-Fi docking as two potential services to be provided by Wi-Fi enabled devices and define a mechanism for efficient discovery of detailed services provided by WSB and docking enabled devices using the Service Name feature of the WFDS framework. In one embodiment, naming components and a naming structure is described for Wi-Fi devices capable of providing either WSB or Wi-Fi docking services.

A WFDS Service Name is UTF-8 encoded string with 255 bytes or less. "Reverse domain name notation" may be used in one embodiment.

WSB

Embodiments provided herein may identify WSB as a service of WFDS and introduce the following service name components for the WSB service that may be needed by the user to make a decision to proceed with connecting to a WSB device:

WSB. Presence of "WSB" as part of the Service Name indicates support of the WSB protocol.

Version. Identifies what version of the WSB protocol is supported. This information would be used to ensure devices that establish connection use the same or a compatible version of WSB protocol.

Mode. Identifies the operation mode of WSB protocol and can be set as following:

MAC—WSB operation in native mode (directly over the MAC)

IP—WSB operation in IP-mode (over TCP/IP)

WSB role. Any WSB device may take the role of either a WSB Host, a WSB Peripheral device, or a WSB Hub. This information would be used by devices looking for a specific role (for example a WSB host looking for WSB peripherals) to narrow down the selection. If a device supports more than one WSB role, e.g., a device that may take the role of either a WSB Host or a WSB Peripheral, then two service names shall be used.

Information about the USB device exposed by WSB:

USB version. Identifies the version of USB which is supported by the USB device behind the WSB. This information assists the user with the selection of the USB device to connect to.

USB-IF defined device class of the USB device behind the WSB.

USB-IF defined device sub-class of the USB device behind the WSB. The USB device class and sub-class may be used either directly by the user or indirectly after being processed by the application SW on the device (for example to map the device class and subclass to an icon and user friendly description of the device) to learn about the functions provided by the device. It may include a user friendly description of the device type like a "printer", "camera", etc. as well as a user string.

Additionally, with the understanding that a given naming component may appear in any order in a given Service Name, this invention proposes the following service name structure for WSB that encompasses all of the above mentioned naming components.

Org.Wi-Fi.WSB. version.mode. Host. USB_version

Org.Wi-Fi.WSB. version.mode.Peripheral. USB_version.USB-IF_defined_device_class. USB-IF_defined_ device_ sub-class Org.Wi-Fi.WSB. version.mode.Hub. USB_version. USB-IF_defined_device_class. USB-IF_defined_device_subclass It is noted that the naming structure for the WSB Peripheral and WSB Hub can carry naming components for multiple instances of USB devices/functions. Also, in the case of the WSB Hub, the information about the USB device, if present, refers to the USB device connected downstream of the WSB Hub.

FIG. 1, shown generally as 100, is an illustration of Wi-Fi Serial Bus (WSB) Service Name components and an example WSB Service Name. 110 illustrates proposed WSB service name components, which in an embodiment may include, but is not limited to, WSB, Mode, Version, WSB role, USB Version, USB-IF defined Class code, and USB-IF Defined SubClass.

120 illustrates in an embodiment an example of a WSB service name In this particular example, WSB service name may include but is not limited to, Org and Wi-Fi, which are organization related components; WSB, MAC, 1.0 and HUB; USB 2.0, MSC, MMC-2, which are components related to a Mass Storage USB device exposed by the WSB Hub; and USB 2.0 and None, which are components related to an USB device exposed by the WSB Hub.

Again, FIG. 1 is for illustration and exemplification purposes and it is understood that are numerous variations of WSB service name components and WSB service names intended to be included in the embodiments illustrated herein.

Wi-Fi Docking

Embodiments herein provide identifying Wi-Fi docking as a service on top of WFDS and illustrates the following service name components for Wi-Fi docking services that may be needed by the user to make a decision to proceed with connecting to a Wi-Fi Docking device:

Docking. Presence of Docking as part of the Service Name indicates support of the Wi-Fi Docking protocol.

Version. Identifies what version of the Wi-Fi Docking protocol is supported. This information would be used to ensure devices that establish connection use the same or a compatible version of Wi-Fi Docking protocol.

Role. Any device in a docking network may take the role of either a Dockee, or a dock (WDC).

WDN. Wi-Fi Docking Environment support by the device. For example, "home office", "enterprise", "consumer", etc.

Feature. Additional feature, devices supported by the device. Examples include Display, USB, etc.

Additionally, with the understanding that a given naming component may appear in any order in a given Service Name, embodiments provide the following service name structure for Wi-Fi Docking that encompasses all of the above mentioned naming components. Org.Wi-Fi.Docking. version. role.WDN.feature It is noted that there may be multiple instances of naming component features present.

Figure 2:
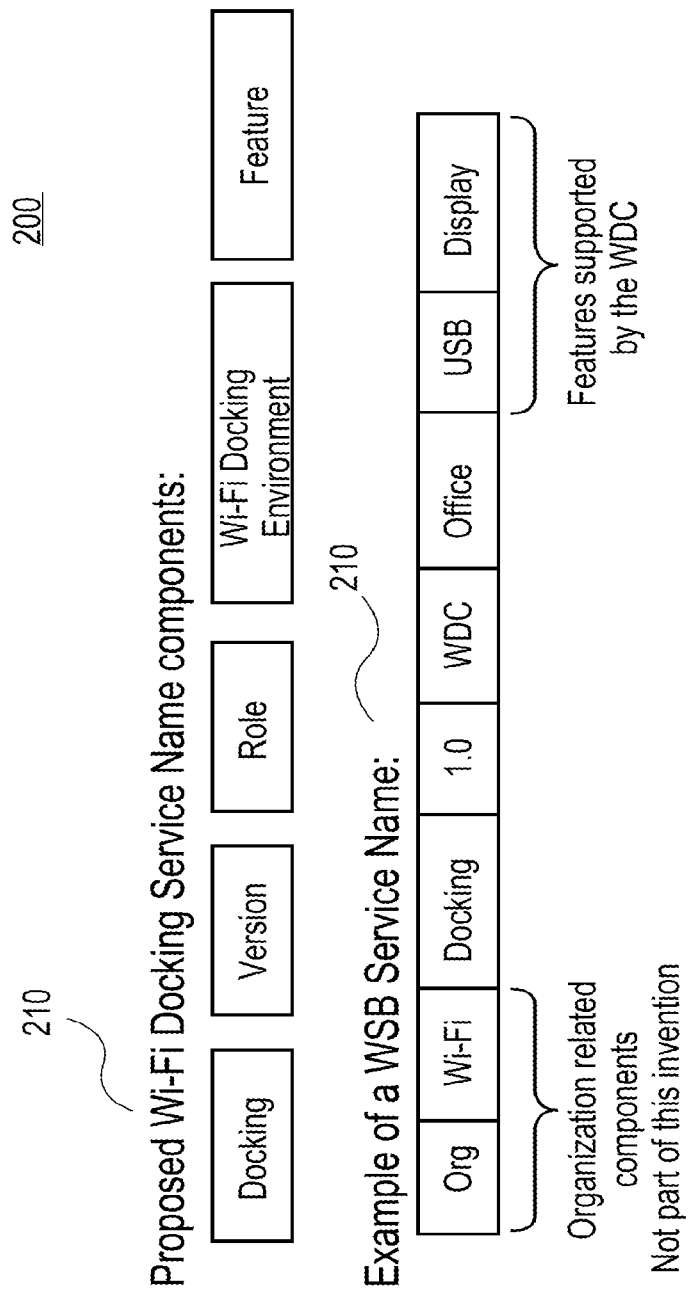
FIG. 2 illustrates Wi-Fi Docking (WDC) Service Name components and an example Docking Service Name.

FIG. 2 illustrates generally at 200, Wi-Fi Docking (WDC) Service Name components and an example Docking Service Name. In an example embodiment, the components 210 may include Docking, Version, Role, Wi-Fi Docking Environment and Feature. An example of a WSB Service Name is shown at 220 and may include: Org and Wi-Fi, which are organization related components; Docking, 1.0, WDC, Office; and USB and Display, which are features supported by the WDC.

FIG. 2 is for illustration and exemplification purposes and it is understood that are numerous variations of WDC service name components and WDC service names intended to be included in the embodiments illustrated herein It is noted for both WSB and Docking that although all the Service Name structures defined above are written with prefix Org.Wi-Fi, their use is not limited to any particular format or standard (such as Wi-Fi Alliance), and can also be used with third party developers. Also, it is noted that for all the Service Name components, the values "any" or "unknown" can be used in inquiry and responses, respectively.

The techniques described herein have been described in the context of IEEE 802.11 (Wi-Fi) networks. However, embodiments are not limited to such networks.

Figure 3:
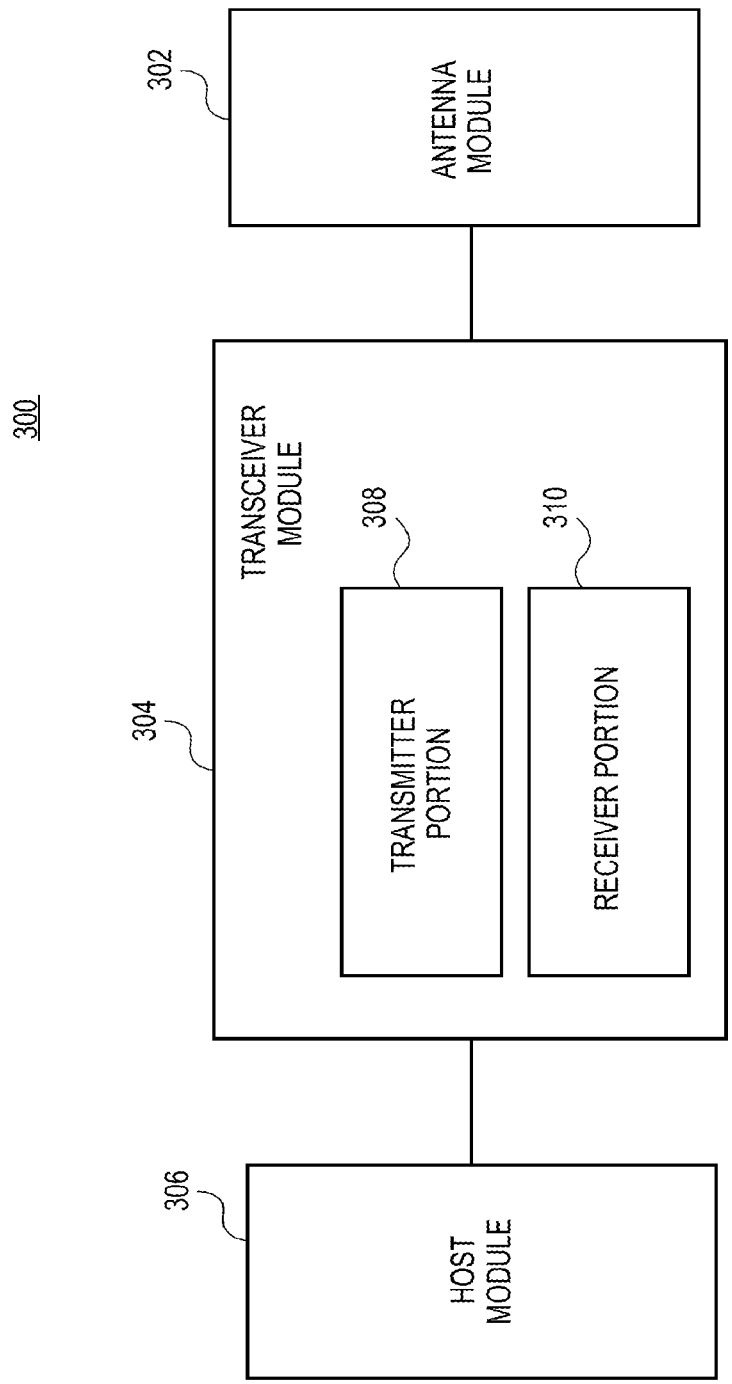
FIG. 3 is a diagram of an exemplary wireless communications device.

FIG. 3 is a diagram of an implementation 300 that may be included in a wireless device, such as a STA and/or an access point or Wi-Fi enabled devices that may utilize WSB and WDC. Device 300 may perform techniques, as described herein, such as techniques for discovery of Wi-Fi serial bus and Wi-Fi docking services. As shown in FIG. 3, implementation 100 may include an antenna module 302, a transceiver module 304, and a host module 306. These elements may be implemented in hardware, software, or any combination thereof.

Antenna module 302 provides for the exchange of wireless signals with remote devices. Moreover, antenna module 302 may transmit wireless signals through one or more directional radiation patterns. Thus, antenna module 302 may include multiple antennas and/or multiple radiating elements (e.g., phased-array radiating elements).

Transceiver module 304 provides an interface between antenna module 302 and host module 306. For instance, transmitter portion 308 within transceiver module 304 receives symbols from host module 306 and generates corresponding signals for wireless transmission by antenna module 302. This may involve operations, such as modulation, amplification, and/or filtering. However, other operations may be employed.

Conversely, receiver portion 310 within transceiver module 304 obtains signals received by antenna module 302 and generates corresponding symbols. In turn, receiver portion 310 provides symbols to host module 306. This generation of symbols may involve operations, including (but not limited to) demodulation, amplification, and/or filtering.

The symbols exchanged between host module 306 and transceiver module 304 may form messages or information associated with one or more protocols, and/or one or more user applications. Thus, host module 306 may perform operations corresponding to such protocol(s) and/or user application(s). Further, exemplary protocols include various media access, network, transport and/or session layer protocols. Exemplary user applications include telephony, messaging, e-mail, web browsing, content (e.g., video and audio) distribution/reception, and so forth.

In addition, host module 306 may exchange control information with transceiver module 304. This control information may pertain to the operation and status of transceiver module 304. For instance, this control information may include directives that host module 306 sends to transceiver module 304. Such directives may establish operating parameters/characteristics for transceiver module 304. Also, this control information may include data (e.g., operational status information) that host module 306 receives from transceiver module 304. It may further incorporate naming components and a naming structure for Wi-Fi devices capable to provide either WSB or Wi-Fi docking services.

As described above, transmitter portion 308 generates signals from symbols, and receiver portion 310 generates symbols from received signals. To provide such features, transmitter portion 308 and receiver portion 310 may each include various components, such as modulators, demodulators, amplifiers, filters, buffers, upconverters, and/or downconveters. Such components may be implemented in hardware (e.g., electronics), software, or any combination thereof.

The techniques described herein may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few. A typical computing system includes at least one processing unit, associated memory and a number of input/output (I/O) devices. A computing system processes information according to a program and produces resultant output information via I/O devices.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

The invention claimed is:

1. An apparatus, comprising:
   a memory; and
   logic circuitry coupled to the memory, the logic circuitry to:
   determine a service name of a wireless serial bus (WSB) service that exposes one or more functions of a universal serial bus (USB) device, the service name to indicate information about the USB device; and
   generate a message for wireless transmission by one or more antennas in accordance with a service discovery mechanism of a Wi-Fi Direct Services (WFDS) framework, the message to comprise the service name for the WSB service that exposes the one or more functions of the USB device.

2. The apparatus of claim 1, the service name to include a service name component indicating a device class associated with the USB device.

3. The apparatus of claim 1, the service name to include a service name component indicating a device sub-class associated with the USB device.

4. The apparatus of claim 1, the service name to comprise a Wi-Fi Direct Services (WFDS) service name.

5. The apparatus of claim 1, the service name to include a service name component comprising a value 'wsb'.

6. The apparatus of claim 1, the service name to include a string 'org.wi-fi.wsb'.

7. The apparatus of claim 1, the WSB service to utilize Wi-Fi Direct technology.

8. A system, comprising:
the apparatus of claim 1; and
a transmitter to generate signals for wireless transmission by the one or more antennas.

9. At least one non-transitory computer-readable storage medium, comprising a set of instructions that, in response to being executed on a computing device, cause the computing device to:
determine a service name of a wireless serial bus (WSB) service that exposes one or more functions of a universal serial bus (USB) device, the service name to indicate information about the USB device; and
generate a message for wireless transmission by one or more antennas in accordance with a service discovery mechanism of a Wi-Fi Direct Services (WFDS) framework, the message to comprise the service name for the WSB service that exposes the one or more functions of the USB device.

10. The at least one non-transitory computer-readable storage medium of claim 9, the service name to include a service name component indicating a device class associated with the USB device.

11. The at least one non-transitory computer-readable storage medium of claim 9, the service name to include a service name component indicating a device sub-class associated with the USB device.

12. The at least one non-transitory computer-readable storage medium of claim 9, the service name to comprise a Wi-Fi Direct Services (WFDS) service name.

13. The at least one non-transitory computer-readable storage medium of claim 9, the service name to include a service name component comprising a value 'wsb'.

14. The at least one non-transitory computer-readable storage medium of claim 9, the service name to include a string 'org.wi-fi.wsb'.

15. The at least one non-transitory computer-readable storage medium of claim 9, the WSB service to utilize Wi-Fi Direct technology.

16. A system, comprising:
one or more antennas;
circuitry to:
determine a service name of a wireless serial bus (WSB) service that exposes one or more functions of a universal serial bus (USB) device, the service name to indicate information about the USB device; and
generate symbols forming a message comprising the service name for the WSB service that exposes the one or more functions of the USB device, the message to be generated in accordance with a service discovery mechanism of a Wi-Fi Direct Services (WFDS) framework; and
a transmitter to generate, based on the symbols, signals for wireless transmission by the one or more antennas.

17. The system of claim 16, the service name to include a service name component indicating a device class associated with the USB device.

18. The system of claim 16, the service name to include a service name component indicating a device sub-class associated with the USB device.

19. The system of claim 16, the service name to comprise a Wi-Fi Direct Services (WFDS) service name.

20. The system of claim 16, the service name to include a service name component comprising a value 'wsb'.

21. The system of claim 16, the service name to include a string 'org.wi-fi.wsb'.

22. The system of claim 16, the WSB service to utilize Wi-Fi Direct technology.

* * * * *